(12) United States Patent
Chen

(10) Patent No.: US 11,215,842 B1
(45) Date of Patent: Jan. 4, 2022

(54) 3D INFRARED NIGHT VISION DEVICE

(71) Applicant: Gaodi Digital (Qingdao) Co., Ltd., Qingdao (CN)

(72) Inventor: Zhujun Chen, Qingdao (CN)

(73) Assignee: Gaodi Digital (Qingdao) Co., Ltd., Qingdao (CN)

( * ) Notice: Subject to any disclaimer, the term of this patent is extended or adjusted under 35 U.S.C. 154(b) by 0 days.

(21) Appl. No.: 17/395,475

(22) Filed: Aug. 6, 2021

(30) Foreign Application Priority Data

Jul. 28, 2021 (CN) .......................... 202110857327.0
Jul. 28, 2021 (CN) .......................... 202121736866.0

(51) Int. Cl.
*G02B 27/14* (2006.01)
*G02B 30/26* (2020.01)
*G02B 25/00* (2006.01)
*G02B 27/01* (2006.01)

(52) U.S. Cl.
CPC ........... *G02B 30/26* (2020.01); *G02B 25/001* (2013.01); *G02B 27/0101* (2013.01); *G02B 2027/014* (2013.01); *G02B 2027/0134* (2013.01)

(58) Field of Classification Search
CPC .. G02B 30/26; G02B 25/001; G02B 27/0101; G02B 2027/0134; G02B 2027/014
USPC ......................................................... 359/630
See application file for complete search history.

(56) References Cited

U.S. PATENT DOCUMENTS

2020/0275071 A1* 8/2020 Zavoyskikh ....... G02B 27/0179

* cited by examiner

*Primary Examiner* — James C. Jones

(57) ABSTRACT

A 3D infrared night vision device includes a lens module, a display screen assembly including a first and second display screens respectively formed on opposite ends thereof, a dioptric adjustment device including a first dioptric adjustment member and a second dioptric adjustment member independently arranged thereon, an eyepiece assembly including a first and second eyepieces arranged on the left and right thereof, and an image processor connected to the lens module, and connected with the first and second display screens to synchronize the first and second display screens to display two-dimensional images. The first and second display screens respectively transmit the two-dimensional images to their corresponding first and second eyepieces through their respective first and second dioptric adjustment members. The first and second dioptric adjustment members respectively adjust diopters of the first and second eyepieces, so that the diopters of the first and second eyepieces are different to form binocular parallax.

9 Claims, 2 Drawing Sheets

3D INFRARED NIGHT VISION DEVICE

BACKGROUND

1. Technical Field

The present disclosure generally relates to night vision devices field, and especially relates to a 3D infrared night vision device.

2. Description of Related Art

A conventional night vision device displays a two-dimensional image, so that visual experience is poor. And then, the conventional night vision device, whether a monocular or a binocular, includes an eyepiece with a constant specification, and a definition of an image is adjusted completely depending on a distance between user's eyes and the eyepiece, which is inconvenient and inaccurate, moreover, due to differences of eyes, many people have different visions of their left eyes and right eyes, so that the definitions of the images are needed to be improved.

3D stereoscopic display has a long history, and is appeared as early as the beginning of photography technologies in the 19th century. A reason that we can see stereo visions is that the two eyes of people are horizontally arranged side by side, with an interval of about 50-80 mm between an adult's eyes. Generally, there are differences between men and women, a pupil distance of men's two eyes is larger, and there are individual differences between the same sex people. Therefore, there is a slight difference between the image seen by the left eye and the image seen by the right eye, which is called binocular parallax, so that brains of peoples can interpret the parallax of both eyes to determine distances between objects for producing stereo visions. Because the stereo vision is based on the binocular parallax, so that the 3D stereo display is to reproduce the binocular parallax manually. A general method is to arrange two cameras in parallel to simulate human's eyes and capture two slightly different photos at the same time, so that the left eye and the right eye can respectively see different images through a corresponding camera, so as to simulate the stereo vision. On this basis, a variety of 3D stereo display technologies have been developed, so that a main technology is occurred such as viewing images through 3D glasses.

SUMMARY

The technical problems to be solved: in view of the shortcomings of the related art, the present disclosure relates to a 3D infrared night vision device which can display three-dimensional images and be easily adjusted.

The technical solution adopted for solving technical problems of the present disclosure is:

a 3D infrared night vision device according to an embodiment of the present disclosure includes: a lens module, a display screen assembly including a first display screen and a second display screen respectively formed on opposite ends thereof, a dioptric adjustment device including a first dioptric adjustment member and a second dioptric adjustment member independently arranged thereon, an eyepiece assembly including a first eyepiece and a second eyepiece respectively arranged on a left and a right thereof, and an image processor connected to the lens module, and the first and second display screens to synchronize the first display screen and the second display screen to display two-dimensional images. The first display screen is configured to transmit the two-dimensional images to the first eyepiece through the first dioptric adjustment member, while, the second display screen is configured to transmit the two-dimensional images to the second eyepiece through the second dioptric adjustment member. The first dioptric adjustment member is configured to adjust a first diopter of the first eyepiece, and the second dioptric adjustment member is configured to adjust a second diopter of the second eyepiece, so that the first diopter of the first eyepiece and the second diopter of the second eyepiece are different to form binocular parallax.

Wherein the first dioptric adjustment member adjusts the first diopter by adjusting a distance between the first eyepiece and the first display screen, and the second dioptric adjustment member adjusts the second diopter by adjusting a distance between the second eyepiece and the second display screen.

Wherein each of the first dioptric adjustment member and the second dioptric adjustment member includes an inner barrel and an outer barrel sleeved around the inner barrel, the first eyepiece connected to the inner barrel of the first dioptric adjustment member, the second eyepiece connected to the inner barrel of the second dioptric adjustment member, a matching mechanism composed of a guiding groove that is arranged in an oblique direction, and a protrusion provided between the inner barrel and the outer barrel; when the outer barrel rotates relative to the inner barrel, the inner barrel is close to or away from the display screen assembly.

Wherein the first dioptric adjustment member adjusts the first diopter by adjusting a curvature radius of the first eyepiece, and the second dioptric adjustment member adjusts the second diopter by adjusting a curvature radius of the second eyepiece.

Wherein the first dioptric adjustment member adjusts the first diopter by adjusting a refractive index of the first eyepiece, and the second dioptric adjustment member adjusts the second diopter by adjusting a refractive index of the second eyepiece.

Wherein the night vision device further includes an observation barrel including a first observation barrel and a second observation barrel independently arranged thereon, respectively, the first display screen configured to transmit an image to the first eyepiece through the first observation barrel, and the second display screen configured to transmit an image to the second eyepiece through the second observation barrel.

Wherein a distance between the first observation barrel and the second observation barrel near the eyepiece assembly is greater than a distance between the first observation barrel and the second observation barrel near the display screen assembly.

Wherein the night vision device further includes a protecting member including a first protecting portion connected with one end of the first observation barrel away from the first display screen, and a second protecting portion connected with one end of the second observation barrel away from the second display screen.

Wherein the night vision device further includes an infrared fill-in light arranged on the lens module.

The present disclosure provides the advantages as below: the present disclosure provides two dioptric adjustment members to respectively adjust the diopters of the two eyepieces, with the first eyepiece corresponding to the first dioptric adjustment member, and the second eyepiece corresponding to the second dioptric adjustment member, so that the first diopter of the first eyepiece and the second diopter of the second eyepiece can be adjusted, respectively.

In this way, it can not only realize a naked eye 3D effect through adjusting the first and second diopters, but also adapt to a visual acuity difference between the left eye and the right eye, so as to obtain clearer images observed by users.

Figure 1:
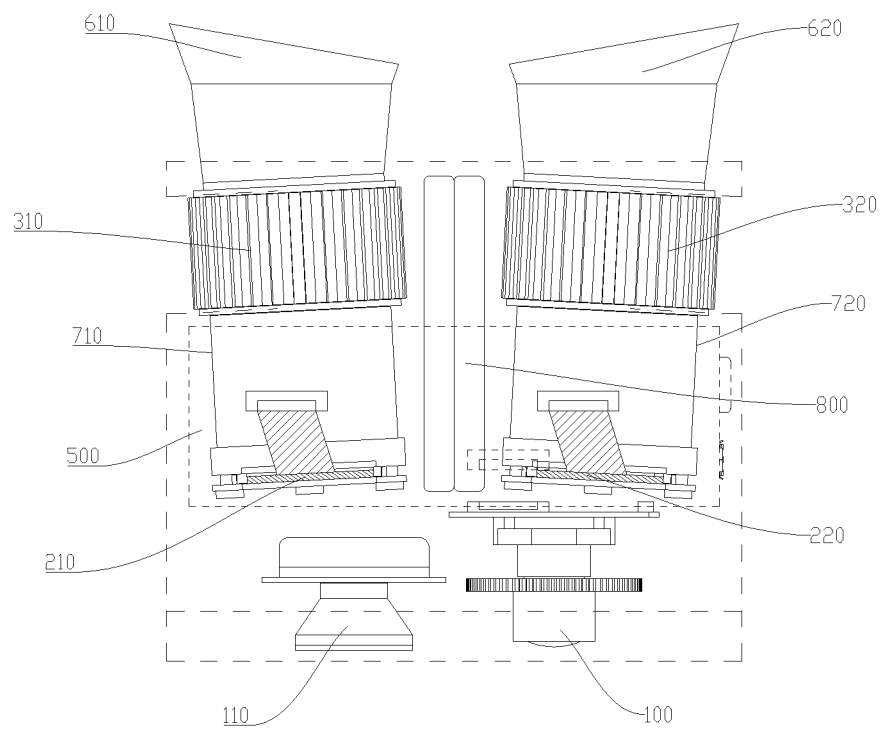
FIG. 1 is a schematic view of a 3D infrared night vision device in accordance with an embodiment of the present disclosure.

The element labels according to the embodiment of the present disclosure shown as below:

lens module 100, infrared fill-in light 110, display screen assembly 200, first display screen 210, second display screen 220, dioptric adjustment device 300, first dioptric adjustment member 310, second dioptric adjustment member 320, inner barrel 301, protrusion 3011, outer barrel 302, guiding groove 3021, eyepiece assembly 400, first eyepiece 410, second eyepiece 420, image processor 500, protecting member 600, first protecting portion 610, second protecting portion 620, observation barrel 700, first observation barrel 710, second observation barrel 720, battery 800.

DETAILED DESCRIPTION

Reference will now be made in detail to embodiments, examples of which are illustrated in the accompanying drawings. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

Referring to FIGS. 1-4, a 3D infrared night vision device according to an embodiment of the present disclosure includes a lens module 100, a display screen assembly 200, a dioptric adjustment device 300, an eyepiece assembly 400 and an image processor 500. The display screen assembly 200 includes a first display screen 210 and a second display screen 220 respectively formed on opposite ends thereof. The dioptric adjustment device 300 includes a first dioptric adjustment member 310 and a second dioptric adjustment member 320 independently arranged thereon. The eyepiece assembly 400 includes a first eyepiece 410 and a second eyepiece 420 respectively arranged on a left and a right thereof. The image processor 500 is connected to the lens module 100, and connected to both the first and second display screens 210, 220 to synchronize the first display screen 210 and the second display screen 220 to display two-dimensional images. The first display screen 210 is configured to transmit the two-dimensional images to the first eyepiece 410 through the first dioptric adjustment member 310, while, the second display screen 220 is configured to transmit the two-dimensional images to the second eyepiece 420 through the second dioptric adjustment member 320. The first dioptric adjustment member 310 is configured to adjust a first diopter of the first eyepiece 410, and the second dioptric adjustment member 320 is configured to adjust a second diopter of the second eyepiece 420, so that the first diopter of the first eyepiece 410 and the second diopter of the second eyepiece 420 are different to form binocular parallax.

The present disclosure provides two dioptric adjustment members to respectively adjust the diopters of the two eyepieces, with the first eyepiece 410 corresponding to the first dioptric adjustment member 310, and the second eyepiece 420 corresponding to the second dioptric adjustment member 320, that is, the first diopter of the first eyepiece 410 and the second diopter of the second eyepiece 420 can be adjusted, respectively. In this way, it can not only realize a naked eye 3D effect through adjusting the diopters, but also adapt to a visual acuity difference between the left eye and the right eye, so as to obtain clearer images observed by users. And it is more convenient without needing additional image processing relative to conventional ways of directly displaying two different images through the display screens to achieve a 3D effect, or directly capturing images from different views through two cameras, which not only reduces a cost and a failure rate of the 3D display, but also improves stability of the 3D display.

As an embodiment of the present disclosure, the first dioptric adjustment member 310 adjusts the first diopter by adjusting a distance between the first eyepiece 410 and the first display screen 210, and the second dioptric adjustment member 320 adjusts the second diopter by adjusting a distance between the second eyepiece 420 and the second display screen 220. It can be understood that when adjusting the distance between the eyepiece and the display screen, a distance between the eyepiece and the eyes is also adjusted, which is simple and convenient to adjust the diopter by adjusting the distance.

Figure 2:
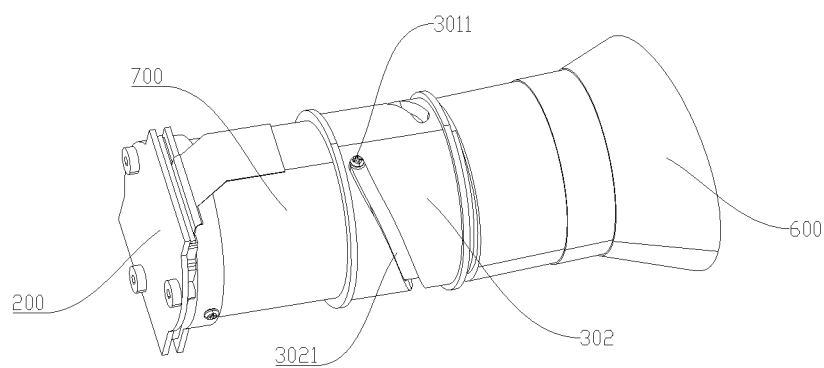
FIG. 2 is a schematic view of an observation barrel of the 3D infrared night vision device of FIG. 1.
Figure 3:
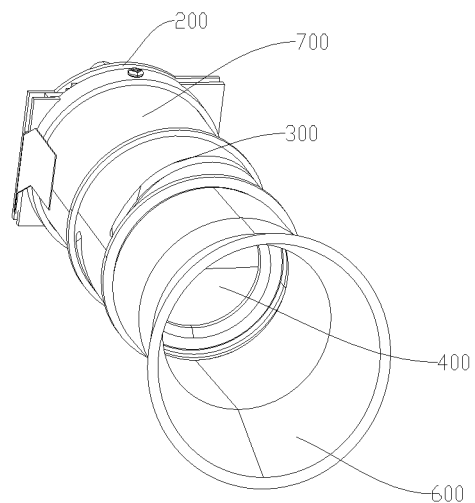
FIG. 3 is similar to FIG. 2, but shown from another view.
Figure 4:
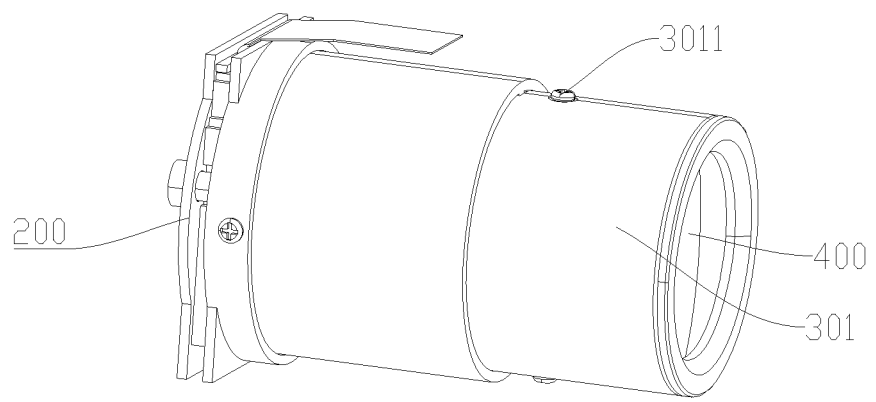
FIG. 4 is a schematic view of an inner barrel of the 3D infrared night vision device of FIG. 1.

Referring to FIG. 2 and FIG. 3, each of the first dioptric adjustment member 310 and the second dioptric adjustment member 320 includes an inner barrel 301 and an outer barrel 320 sleeved around the inner barrel 310. The first eyepiece 410 is connected to the inner barrel 301 of the first dioptric adjustment member 310, and the second eyepiece 420 is connected to the inner barrel 301 of the second dioptric adjustment member 320. A matching mechanism composed of a guiding groove 3021 that is arranged in an oblique direction, and a protrusion 3011 is provided between the inner barrel 301 and the outer barrel 302. When the outer barrel 302 rotates relative to the inner barrel 301, the inner barrel 301 can be close to or away from the display screen assembly 200. By rotatably adjusting the distance, the adjustment is convenient, and a small space is occupied, which is conducive to miniaturization the night vision device, with more accurate adjustment accuracy relative to a direct linear adjustment way. Simply, the direct linear adjustment way can also be adopted according to actual requirements, for example, the guiding groove 3021 is axially arranged. It can be understood that when the guiding groove 3021 is arranged on the inner barrel 301, the protrusion 3011 is arranged on the outer barrel 302, while, when the guiding groove 3021 is arranged on the outer barrel 302, the protrusion 3011 is arranged on the inner barrel 301.

As an embodiment of the present disclosure, the first dioptric adjustment member 310 adjusts the first diopter by adjusting a curvature radius of the first eyepiece 410, and the second dioptric adjustment member 320 adjusts the second diopter by adjusting a curvature radius of the second eyepiece 420. In particular, a cavity can be set in the eyepiece, and the curvature radius can be changed by how much liquid is injected into the cavity. The injected liquid can be transparent liquid such as water, water salt solution or oil. Specifically, deformation of piezoelectric ceramics can be changed by changing a voltage of the piezoelectric ceramics, so as to adjust a shape of the eyepiece and change the curvature radius.

As an embodiment of the present disclosure, the first dioptric adjustment member 310 adjusts the first diopter by adjusting a refractive index of the first eyepiece 410, and the second dioptric adjustment member 320 adjusts the second diopter by adjusting a refractive index of the second eyepiece 420. Simply, A cavity can be arranged in the eyepiece, and the refractive index of the eyepiece can be changed by injecting liquid with different refractive indexes into the cavity. Alternatively, a lens with graded refractive indexes can be used to adjust refractive indexes of a liquid crystal by changing a voltage applied to the liquid crystal.

Referring to FIGS. 1-4, the 3D infrared night vision device further includes an observation barrel 700 including a first observation barrel 710 and a second observation barrel 720 independently arranged thereon, respectively. The first display screen 210 is configured to transmit an image to the first eyepiece 410 through the first observation barrel 710, and the second display screen 220 is configured to transmit an image to the second eyepiece 420 through the second observation barrel 720. The first observation barrel 710 and the second observation barrel 720 are independently set to form two independent observation chambers, so as to avoid that the images of the two display screens from only one eyepiece and affecting visual perception.

A distance between the first observation barrel 710 and the second observation barrel 720 near an eyepiece portion of the first observation barrel 710 is greater than a distance between the first observation barrel 710 and the second observation barrel 720 near a display portion of the first observation barrel 710. That is, an angle is formed between the first observation barrel 710 and the second observation barrel 720, and generally 0-15 degrees. It can be understood that the eyepiece portion of the first observation barrel 710 is an end where the first eyepiece 410 is located, the display portion of the first observation barrel 710 is an end where the first display screen 210 is located, so as the second observation barrel 720. Generally, the angle between the first observation barrel 710 and the second observation barrel 720 is fixed. In particular, the angle between the first observation barrel 710 and the second observation barrel 720 can also be configured to be adjustable, that is, the display portion of the observation barrel 700 is hinged so that the observation barrel can rotate, and the eyepiece portion can be matched with an arc sliding rail, so as to adjust the angle. The angle is formed between the first observation barrel 710 and the second observation barrel 720, which can better form the binocular parallax, so as to observe the 3D images.

Referring to FIGS. 1-4, the 3D infrared night vision device further includes a protecting member 600 including a first protecting portion 610 connected with one end of the first observation barrel 710 away from the first display screen 210, and a second protecting portion 620 connected with one end of the second observation barrel 720 away from the second display screen 220. The protecting member 600 is provided to protect the eyes, so as to conveniently adjust the distance from the eyes of people's to the eyepiece according to the needs.

Referring to FIG. 1, the 3D infrared night vision device further includes an infrared fill-in light 110 arranged on the lens module 100 and configured to be photographed when there is lack of light.

Referring to FIG. 1, the 3D infrared night vision device further includes a battery 800 electrically connected to a control circuit board, and the control circuit board is electrically connected to both the image processor 500 and the lens module 100. The battery 800 is generally arranged between the first display screen 210 and the second display screen 220.

Especially, the 3D infrared night vision device further includes a distance adjusting mechanism configured to adjust the distance between the first observation barrel 710 and the second observation barrel 720 so as to accommodate differences in pupil distances between different individuals. The first display screen 210, the first observation barrel 710, the first eyepiece 410, the first dioptric adjustment member 310 and the first protecting portion 610 are connected together, and the second display screen 220, the second observation barrel 720, the second eyepiece 420, the second dioptric adjustment member 320 and the second protecting portion 620 are also connected as a whole. The distance adjusting mechanism can be configured to move only one of the first observation barrel 710 and the second observation barrel 720, or move both the first observation barrel 710 and the second observation barrel 720. Simply, the distance adjusting mechanism can be configured to set by a groove of a guiding rail, that is, the groove is set on the observation barrel 700 to move with the guiding rail. The observation barrel can be connected with a shifting block, and the observation barrel can be moved by moving the shifting block. Simply, distance adjusting mechanism can also be achieved by other linear moving mechanisms, such as a gear and a rack.

Especially, the 3D infrared night vision device further includes a housing including a cavity, a transverse rail within the cavity to connect with the housing. A pair of moving platforms is respectively connected with the shifting block, so that the shifting block can push the pair of moving platforms to move along the transverse rail. The moving platform includes an arc rail near the eyepiece portion and adapted to the observation barrel 700, so that the moving platform is hinged with the observation barrel 700 near the display portion. That is, the two observation barrels 700 can rotate and move laterally.

The 3D infrared night vision device of the present disclosure provides two dioptric adjustment members to respectively adjust the diopters of the two eyepieces, with the first eyepiece corresponding to the first dioptric adjustment member, and the second eyepiece corresponding to the second dioptric adjustment member, that is, the first diopter of the first eyepiece and the second diopter of the second eyepiece can be adjusted, respectively. In this way, it can not only realize a naked eye 3D effect through adjusting the diopters, but also adapt to a visual acuity difference between the left eye and the right eye, so as to obtain clearer images observed by users.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A 3D infrared night vision device comprising:
   a lens module;
   a display screen assembly comprising a first display screen and a second display screen respectively formed on opposite ends thereof;

a dioptric adjustment device comprising a first dioptric adjustment member and a second dioptric adjustment member independently arranged thereon;

an eyepiece assembly comprising a first eyepiece and a second eyepiece respectively arranged on a left and a right thereof; and an image processor connected to the lens module, and both the first display screen and the second display screen to synchronize the first display screen and the second display screen to display two-dimensional images; and wherein the first display screen is configured to transmit the two-dimensional images to the first eyepiece through the first dioptric adjustment member, while, the second display screen is configured to transmit the two-dimensional images to the second eyepiece through the second dioptric adjustment member; and wherein the first dioptric adjustment member is configured to adjust a first diopter of the first eyepiece, and the second dioptric adjustment member is configured to adjust a second diopter of the second eyepiece, so that the first diopter of the first eyepiece and the second diopter of the second eyepiece are different to form binocular parallax.

2. The 3D infrared night vision device as claimed in claim 1, wherein the first dioptric adjustment member adjusts the first diopter by adjusting a distance between the first eyepiece and the first display screen, and the second dioptric adjustment member adjusts the second diopter by adjusting a distance between the second eyepiece and the second display screen.

3. The 3D infrared night vision device as claimed in claim 2, wherein each of the first dioptric adjustment member and the second dioptric adjustment member comprises an inner barrel and an outer barrel sleeved around the inner barrel, the first eyepiece connected to the inner barrel of the first dioptric adjustment member, the second eyepiece connected to the inner barrel of the second dioptric adjustment member, a matching mechanism composed of a guiding groove that is arranged in an oblique direction, and a protrusion provided between the inner barrel and the outer barrel; when the outer barrel rotates relative to the inner barrel, the inner barrel is close to or away from the display screen assembly.

4. The 3D infrared night vision device as claimed in claim 1, wherein the first dioptric adjustment member adjusts the first diopter by adjusting a curvature radius of the first eyepiece, and the second dioptric adjustment member adjusts the second diopter by adjusting a curvature radius of the second eyepiece.

5. The 3D infrared night vision device as claimed in claim 1, wherein the first dioptric adjustment member adjusts the first diopter by adjusting a refractive index of the first eyepiece, and the second dioptric adjustment member adjusts the second diopter by adjusting a refractive index of the second eyepiece.

6. The 3D infrared night vision device as claimed in claim 1, wherein the night vision device further comprises an observation barrel comprising a first observation barrel and a second observation barrel independently arranged thereon, respectively, the first display screen configured to transmit an image to the first eyepiece through the first observation barrel, and the second display screen configured to transmit an image to the second eyepiece through the second observation barrel.

7. The 3D infrared night vision device as claimed in claim 6, wherein a distance between the first observation barrel and the second observation barrel near the eyepiece assembly is greater than a distance between the first observation barrel and the second observation barrel near the display screen assembly.

8. The 3D infrared night vision device as claimed in claim 6, wherein the night vision device further comprises a protecting member comprising a first protecting portion connected with one end of the first observation barrel away from the first display screen, and a second protecting portion connected with one end of the second observation barrel away from the second display screen.

9. The 3D infrared night vision device as claimed in claim 1, wherein the night vision device further comprises an infrared fill-in light arranged on the lens module.

* * * * *